(12) United States Patent
Ban et al.

(10) Patent No.: US 10,444,929 B2
(45) Date of Patent: Oct. 15, 2019

(54) LASER TOUCH PANEL, DISPLAY DEVICE, DISPLAY SYSTEM AND LASER TOUCH METHOD

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Bo Ban, Beijing (CN); Jianting Wang, Beijing (CN); Haiyan Wan, Beijing (CN); Naijia Guo, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

(*) Notice: Subject to any disclaimer, the term of this patent is extended or adjusted under 35 U.S.C. 154(b) by 22 days.

(21) Appl. No.: 15/572,661

(22) PCT Filed: Apr. 1, 2017

(86) PCT No.: PCT/CN2017/079294
§ 371 (c)(1),
(2) Date: Nov. 8, 2017

(87) PCT Pub. No.: WO2018/045745
PCT Pub. Date: Mar. 15, 2018

(65) Prior Publication Data
US 2018/0284930 A1    Oct. 4, 2018

(30) Foreign Application Priority Data
Sep. 9, 2016 (CN) .......................... 2016 1 0815077

(51) Int. Cl.
*G06F 3/045* (2006.01)
*G06F 3/0488* (2013.01)
(Continued)

(52) U.S. Cl.
CPC .......... *G06F 3/045* (2013.01); *G06F 3/03547* (2013.01); *G06F 3/0412* (2013.01); *G06F 3/0488* (2013.01)

(58) Field of Classification Search
CPC .... G06F 3/045; G06F 3/03547; G06F 3/0412; G06F 3/0488; G06F 3/042
(Continued)

(56) References Cited

U.S. PATENT DOCUMENTS

2002/0060636 A1* 5/2002 Kazuhiro ............. G09G 3/3688
                                                              341/150
2003/0112227 A1* 6/2003 Hong ...................... G06F 3/045
                                                              345/173

(Continued)

FOREIGN PATENT DOCUMENTS

CN          2409589 Y      12/2000
CN          1751330 A       3/2006
(Continued)

OTHER PUBLICATIONS

International Search Report and Written Opinion dated Jul. 4, 2017; PCT/CN2017/079294.

(Continued)

*Primary Examiner* — Stephen G Sherman

(57) ABSTRACT

The present disclosure provides a laser touch panel, a laser touch method for a laser touch panel, a laser touch display device, a laser touch display system and a laser touch panel. The laser touch panel includes a first conductive layer, a second conductive layer, and a light-induced resistance change material layer. The light-induced resistance change material layer is disposed between the first conductive layer and the second conductive layer and is electrically connected to the first conductive layer and the second conductive layer. The light-induced resistance change material
(Continued)

layer is configured to generate a resistance change at a touch position subjected to laser irradiation.

19 Claims, 7 Drawing Sheets

(51) Int. Cl.
*G06F 3/0354* (2013.01)
*G06F 3/041* (2006.01)

(58) Field of Classification Search
USPC ........ 345/173–179; 178/18.01–18.09, 18.11, 178/19.01–19.07
See application file for complete search history.

(56) References Cited

U.S. PATENT DOCUMENTS

| | | | |
|---|---|---|---|
| 2005/0116915 A1* | 6/2005 | Nakajima | G02F 1/136259 345/93 |
| 2006/0132451 A1 | 6/2006 | Salters et al. | |
| 2009/0295761 A1 | 12/2009 | Liu | |
| 2012/0195021 A1* | 8/2012 | Achtenhagen | G09G 3/001 362/84 |
| 2014/0368758 A1* | 12/2014 | Liu | G06F 3/0412 349/12 |
| 2015/0349774 A1* | 12/2015 | Chern | H03K 17/9645 345/174 |

FOREIGN PATENT DOCUMENTS

| | | |
|---|---|---|
| CN | 1940840 A | 4/2007 |
| CN | 101221845 A | 7/2008 |
| CN | 101430629 A | 5/2009 |
| CN | 101593067 A | 12/2009 |
| CN | 202904536 U | 4/2013 |
| CN | 103235656 A | 8/2013 |
| CN | 103389581 A | 11/2013 |
| CN | 105867701 A | 8/2016 |
| CN | 106339144 A | 1/2017 |
| JP | 60-010395 A | 1/1985 |

OTHER PUBLICATIONS

Chinese Patent Office Search Report dated Feb. 24, 2017; Appln. 201610815077.3.
The First Chinese Office Action dated May 4, 2017, Appln. 201610815077.3.
The Second Chinese Office Action dated Aug. 30, 2017; Appln. 201610815077.3.

* cited by examiner

LASER TOUCH PANEL, DISPLAY DEVICE, DISPLAY SYSTEM AND LASER TOUCH METHOD

TECHNICAL FIELD

Embodiments of the present disclosure relate to a laser touch panel, a laser touch display device, a laser touch display system and a laser touch method for a laser touch panel.

BACKGROUND

With the popularity of consumer electronics products such as smart phones, a touch display panel has been widely recognized. In order to meet the demand for large-size touch display products, various touch technologies have been developed. As the conventional touch screen can only be operated through touch operation by a human finger or a touch pen to achieve touch, thus limiting the distance for achieving touch. In use of large-size display panel, the operator needs to touch on the touch panel to achieve touch, but this time it is difficult to achieve full-screen touch, and the operator cannot better observe the entire screen, thus limiting development of the large-size touch panel and relevant products.

SUMMARY

At least one embodiment of the present disclosure provides a laser touch panel, comprising a first conductive layer, a second conductive layer, and a light-induced resistance change material layer. The light-induced resistance change material layer is disposed between the first conductive layer and the second conductive layer, and is electrically connected to the first conductive layer and the second conductive layer, respectively, the light-induced resistance change material layer is configured to generate a resistance change at a touch position subjected to laser irradiation.

Another embodiment of the present disclosure provides a laser touch display device, comprising the laser touch panel as described above.

Another embodiment of the present disclosure provides a laser touch method for a laser touch panel, the laser touch method comprising applying a driving voltage to the first conductive layer and/or the second conductive layer, testing a response voltage of the second conductive layer and/or the first conductive layer, and acquiring a touch position of the laser touch panel irradiated by laser based on the driving voltage and the response voltage.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 1 (*b*) is a schematic cross-sectional view of the laser touch panel shown in FIG. 1 (*a*) taken along the line A-A';

FIG. 2(*b*) is an equivalent circuit diagram of a laser touch panel according to an embodiment of the present disclosure when subjected to laser irradiation;

FIG. 3(*b*) is a schematic cross-sectional view of the laser touch panel shown in FIG. 3 (*a*) taken along line A-A';

FIG. 4(*b*) is an equivalent circuit diagram of a laser touch panel according to another embodiment of the present disclosure when subjected to laser irradiation;

FIG. 5(*b*) is a schematic plan view of a first conductive layer and a second conductive layer of another structure of the laser touch panel according to another embodiment of the present disclosure;

DETAILED DESCRIPTION

Figure 1A:
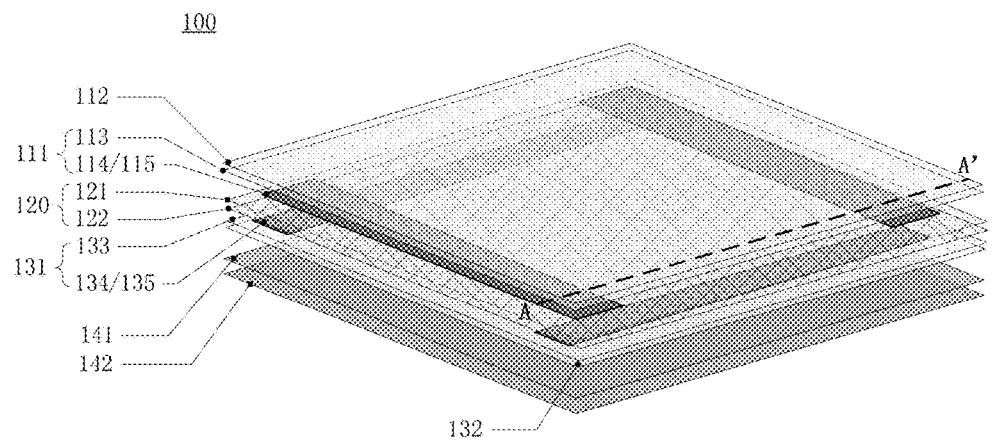
FIG. 1 (*a*) is a schematic structural view of a laser touch panel according to an embodiment of the present disclosure.

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical and scientific terms used in the present disclosure should be understood in the ordinary sense of those skilled in the art to which this disclosure pertains. The "first", "second" and similar words used in the specification and claims of the present disclosure do not denote any order, quantity or importance, but are merely intended to distinguish between different components. "connecting" or "connected" and the like are not limited to physical or mechanical connections, but may include electrical connections, whether direct or indirect.

Embodiments of the present disclosure provide a laser touch panel and a laser touch method therefor, a laser touch display device and a laser touch display system, realizing a remote laser touch to the display device.

At least one embodiment of the present disclosure provides a laser touch panel. The laser touch panel comprises a first conductive layer, a second conductive layer, and a light-induced resistance change material layer. The light-induced resistance change material layer is disposed between the first conductive layer and the second conductive layer, and is electrically connected to the first conductive layer and to the second conductive layer, the light-induced resistance change material layer is configured to generate a resistance change at a touch position subjected to laser irradiation. Through the first conductive layer and the second conductive layer, the position at which the resistance change occurs on the touch panel can be detected so as to be used for realizing touch.

In various embodiments, for example, the light-induced resistance change material layer can comprise a thermistor material layer and a laser absorbing material layer, which are laminated with each other. The laser absorbing material layer is configured to generate heat at the touch position when irradiated by laser so that the touch position undergoes a temperature change, while the thermistor material layer is configured to generate resistance change depending on the temperature change. Also for example, the light-induced resistance change material layer comprises a photosensitive material layer, which generates resistance change at the touch position when irradiated by laser.

In order to detect a position on the touch panel at which the resistance change occurs by means of the first conductive layer and the second conductive layer, so that the touch can be realized, various detection methods can be adopted. These detection methods comprises, but are not limited to, four-wire detection, five-wire detection, matrix detection, etc., which can be applied to various light-induced resistance change material layer.

Various embodiments of the disclosure and specific examples thereof will be described in conjunction with the accompanying drawings, in which the different features of these specific embodiments can be combined with each other in the absence of mutual conflict, as described below, to obtain new embodiments, which also falls within the scope of the present disclosure.

Figure 1B:
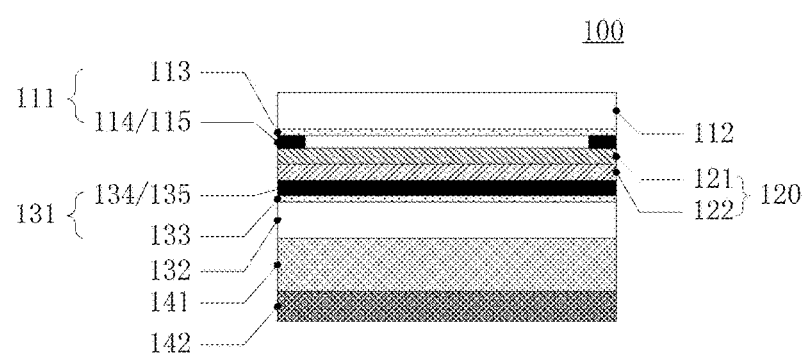

For example, FIG. 1(a) and FIG. 1(b) are a schematic structural view and a schematic cross-sectional view of the laser touch panel 100 according to an embodiment of the present disclosure, respectively. The schematic cross-sectional view as illustrated in FIG. 1(b) is taken along the line A-A' in FIG. 1(a).

As illustrated in FIG. 1(a) and FIG. 1(b), the laser touch panel 100 includes a first conductive layer 111, a second conductive layer 131, and a light-induced resistance change material layer 120, which is disposed between the first conductive layer 111 and the second conductive layer 131 and is electrically connected to the first conductive layer 111 and to the second conductive layer 131. The light-induced resistance change material layer 120 is configured to generate a resistance change at a touch position subjected to laser irradiation, and the position at which the resistance change occurs on the touch panel can be detected so as to be used for realizing touch.

For example, as illustrated in FIG. 1(a) and FIG. 1(b), the light-induced resistance change material layer 120 comprises a laser absorbing material layer 121 and a thermistor material layer 122. The laser absorbing material layer 121 is configured to generate heat at the touch position when irradiated by laser so that the touch position undergoes a temperature change. The temperature change is transferred to the thermistor material layer 122 by the laser absorbing material layer 121. While the thermistor material layer 122 is configured to generate resistance change depending on the temperature change. So, it is possible to realize a resistance change at a touch position subjected to laser irradiation.

For example, the material for the laser absorbing material layer 121 can be a material having a high absorptivity to a laser, and the laser absorbing material layer 121 can convert the absorbed laser light into heat so that temperature changes at the touch position. For example, for a laser having a wavelength in the vicinity of 1.06 um, the laser absorbing material layer 121 can be made of carbon steel, stainless steel, aluminum or other suitable material. In the embodiment of the present disclosure, a corresponding laser absorbing material layer can be selected according to the laser for realizing touch.

For example, the thermistor material layer 122 can vary in resistance depending on the temperature change. The thermistor material layer 122 can be made of a material having a negative temperature coefficient, and the negative temperature coefficient material refers to a material in which the resistance decreases as the temperature increases. For example, the negative temperature coefficient material can be a heat-sensitive ceramic obtained by sufficiently mixing, molding and sintering two or more metal oxides of manganese, copper, silicon, cobalt, iron, nickel and zinc, its resistivity varies with material composition ratio, sintering atmosphere, sintering temperature and structure state. Again for example, the negative temperature coefficient material can also be non-oxide thermosensitive ceramics such as silicon carbide, tin selenide, tantalum nitride and the like.

For example, in order to provide protection, support, etc., it is preferable that the laser touch panel 100 can further comprise a first transparent substrate 112 and a second transparent substrate 132 disposed parallel and opposite to each other. The first transparent substrate 112 and the second transparent substrate 132 can be glass substrates, quartz substrates, plastic substrates (e.g., polyethylene terephthalate (PET) substrates) or substrates made of other suitable materials.

For example, the first conductive layer 111 is provided on the side of the first transparent substrate 112 facing the light-induced resistance change material layer 120, and the second conductive layer 131 is disposed on the side of the second transparent substrate 132 facing the light-induced resistance change material layer 120.

For example, the first conductive layer 111 can comprise a first transparent conductive film 113 and a first electrode 114 disposed on the first transparent conductive film 113 and electrically connected to the first transparent conductive film 113. Even though FIG. 1(b) illustrates that the first electrode 114 is formed on the lower side of the first transparent conductive film 113, the laminated positions of the two elements can be exchanged. Thus, the first electrode 114 can be formed on the upper side of the first transparent conductive film 113.

For example, the second conductive layer 131 comprises a second transparent conductive film 133 and a second electrode 134 disposed on the second transparent conductive film 133 and electrically connected to the second transparent conductive film 133. The first electrode 114 comprises two strip-like first sub-electrodes 115 arranged in parallel, and the second electrode 134 comprises two strip-like second sub-electrodes 135 arranged in parallel. Even though FIG. 1(b) illustrates that the second electrode 134 is formed on the upper side of the second transparent conductive film 133, the laminated positions of the second transparent conductive film 133 and the second electrode 134 can be exchanged so that the second electrode 134 can be formed on the lower side of the second transparent conductive film 133.

For example, the first sub-electrode 115 and the second sub-electrode 135 are arranged crossing each other. For example, the extending directions of the first sub-electrode 115 and the second sub-electrode 135 are perpendicular to each other.

For example, the first transparent conductive film 113 and the second transparent conductive film 133 can be made of indium tin oxide (ITO), indium zinc oxide (IZO), or other suitable transparent conductive material. For example, the first electrode 114 and the second electrode 134 can be made of silver, copper, aluminum, aluminum alloy, or other suitable conductive material.

In the present embodiment, there can be various touch position determining methods based on the operation principle of the laser touch panel 100. The operation principle and the touch position determining method of the laser touch panel 100 will be described in connection with the example as illustrated in FIG. 2(a) and FIG. 2(b).

Figure 2A:
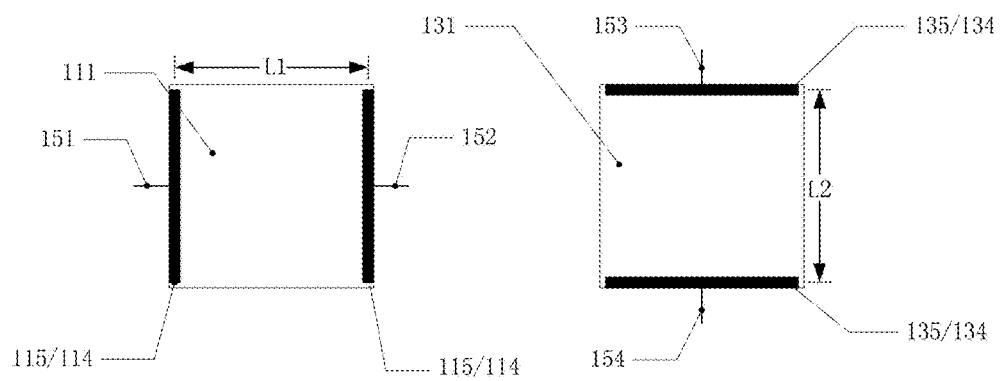
FIG. 2(*a*) is a schematic plan view of the first conductive layer and the second conductive layer of the laser touch panel according to one embodiment of the present disclosure.
Figure 2B:
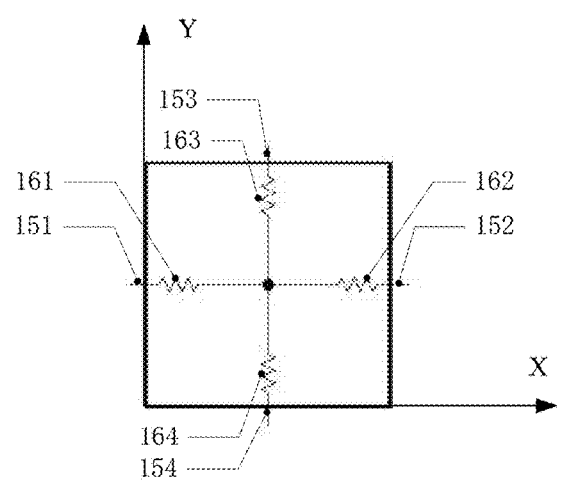

For example, as illustrated in FIG. 2(a), the distance between the two strip-like first sub-electrodes 115 arranged in parallel is L1, the first lead 151 is electrically connected to one of the strip-like first sub-electrodes 115, and the second lead 152 is electrically connected to the other strip-like first sub-electrode 115. The distance between the two strip-like second sub-electrodes 135 arranged in parallel is L2, the third lead 153 is electrically connected to one of the strip-like second sub-electrodes 135, and the fourth lead 154 is electrically connected to the other strip-like second sub-electrode 135.

For example, when touched with a laser (e.g., irradiated by laser), the laser absorbing material layer 121 generates heat at a touch position irradiated by laser and the temperature of the touch position is caused to rise so that the resistance of the thermistor material layer 122 at the touch position is decreased, and the first conductive layer 111 and the second conductive layer 131 are conducted at the touch position. For example, the cross section of the laser (the diameter of the irradiation spot) can be, for example, 0.1 to 2 mm.

At that time, the equivalent circuit formed by the first conductive layer 111, the second conductive layer 131, the laser absorbing material layer 121, and the thermistor material layer 122 is illustrated in FIG. 2 (b). A first resistor 161 (resistance of which is R1) is formed between the touch position and the stripe-like first sub-electrode 115 electrically connected to the first lead 151, a second resistor 162 (resistance of which is R2) is formed between the touch position and the striking first sub-electrode 115 electrically connected to the second lead 152, and a third resistor 163 (resistance of which is R3) is formed between the touch position and the stripe-like second sub-electrode 135 electrically connected to the third lead 153, and a fourth resistor 164 (resistance of which is R4) is formed between the touch position between the striking second sub-electrode 135 electrically connected to the fourth lead 154.

For example, a Cartesian coordinate system is introduced in order to clearly indicate the touch position. The X-axis is parallel to the strip-like second sub-electrode 135, and the Y-axis is parallel to the strip-like first sub-electrode 115. The symmetrical axis of the strip-like second sub-electrode 135 electrically connected to the fourth lead 154 in the direction of Y-axis coincides with the X-axis, and the symmetrical axis of the strip-like first sub-electrode 115 electrically connected to the first lead 151 in the direction of X-axis coincides with the Y-axis.

For example, in order to obtain the X coordinate of the touch position, the first driving voltage Vdrive1 is applied to the second lead 152 and the first lead 151 is grounded, so that a continuous uniform parallel voltage distribution is formed between the two strip-like first sub-electrodes 115 of the first conductive layer 111. Since the first conductive layer 111 and the second conductive layer 131 are conducted at the touch position, the first response voltage $V1=R1/(R1+R2)\times Vdrive1$ can be obtained through the third lead 153. Since the second transparent conductive film 133 (e.g., an ITO layer) is uniformly conductive, the X-axis coordinate (i.e., the first coordinate) of the touch position is $Loc1=V1/Vdrive1\times L1$.

For example, in order to obtain the Y coordinate of the touch position, the second driving voltage Vdrive2 is applied to the third lead 153 and the fourth lead 154 is grounded, so that a continuous uniform parallel voltage distribution is formed between the two stripe-like second sub-electrode 135 of the second conductive layer 131. Since the first conductive layer 111 and the second conductive layer 131 are conducted at the touch position, the second response voltage $V2=R4/(R3+R4)\times Vdrive2$ can be obtained through the second lead line 152. Since the second transparent conductive film 133 (e.g., an ITO layer) is uniformly conductive, the Y coordinate of the touch position (i.e., the second coordinate) $Loc2=V2/Vdrive2\times L2$.

For example, embodiments of the present disclosure comprise, but are not limited to, acquiring the coordinates of the touch position in the manner described above. For example, the first driving voltage can be applied to the first lead 151 and the second lead 152 can be grounded. The first response voltage is obtained through the third lead 153 or the fourth lead 154. The second drive voltage can also be applied to the fourth lead 154 and the third lead 153 can be grounded, and the second response voltage is acquired through the first lead 151 or the second lead 152.

For example, the formula for calculating the coordinates of the touch position can be changed according to the change in the manner of applying the drive voltage and acquiring the response voltage and/or the change in the Cartesian coordinate system setting.

For example, when two strip-like first sub-electrodes 115 are provided along two edges of the touch panel in the width direction (X direction in FIG. 2 (b)), and the width of the two strip-like first sub-electrodes 115 is negligible with respect to the width of the touch panel, and the pitch L1 of the two stripe-like first sub-electrodes 115 can adopt the width value of the touch panel. When the two stripe second sub-electrodes 135 are respectively provided along the two edges of the touch panel in the length direction (Y direction in FIG. 2 (b)), and the width of the two strip-like second sub-electrodes 135 is negligible with respect to the length of the touch, the pitch L2 of the two stripe-like second sub-electrodes 135 can adopt the length value of the touch panel. When the strip-like first sub-electrodes 115 and the strip-like second sub-electrodes 135 are not provided in the manner as described above, the pitch thereof can be obtained by test. Therefore, the coordinates of touch position that are irradiated with the laser can be obtained by the above-described method. And then touch operation can be achieved.

For example, it is preferable that, in order to protect a display panel provided on the back side of the laser touch panel 100, as illustrated in FIGS. 1(a) and 1(b), the laser touch panel 100 can further comprise a laser protection layer 141. The laser protection layer 141 can be disposed on the side of the second transparent substrate 132 away from the light-induced resistance change material layer 120, but the embodiments of the present disclosure are not limited thereto. The laser protection layer 141 is configured to absorb the excessive laser transmitted through the laser absorbing material layer 121 and the thermistor material layer 122 so as to prevent the transmitted laser from damaging the display panel used in conjunction with the laser touch panel 100. The material of the laser protection layer 141 can be a material having a high absorption rate for the laser and a high transmittance for the light emitted from the display panel. For example, glass doped rare earth element can be used as the material of the laser protection layer 141. The rare earth ions doped in the glass doped rare earth can be selected according to the operating wavelength of the laser touch panel 100 (the wavelength of laser light that can be responded). For example, for a laser with a wavelength near 1.06 microns, ytterbium ions or samarium ions can be used as rare earth ions in glass doped rare earth. The glass matrix can be selected according to the transmittance, cost and other factors that are required by the touch panel for the glass substrate. For example, borosilicate glass or quartz glass can be selected as the glass matrix. The thickness of the laser protection layer 141 can be set in accordance with the intensity of excessive laser capable of transmitting the laser absorbing material layer 121 and the thermistor material layer 122 and the absorption coefficient of the selected laser by the glass doped rare earth so that the intensity of laser passing through the laser protection layer 141 does not cause damage to the display panel used in conjunction with the laser touch panel 100. Thus, the security of the display panel is ensured.

For example, in order to better protect the display panel provided on the back side of the laser touch panel 100, as illustrated in FIGS. 1(a) and 1(b), the laser touch panel 100 can further comprise a heat insulating layer 142, which can be provided on the side of the laser protection layer 141 away from the second transparent substrate 132. The material for forming the heat insulating layer 142 can be a heat insulating glass having a high transmittance for the light emitted from the display panel. For example, the insulating layer 142 can be made of phosphate glass or silicate glass. The heat insulating layer 142 can block the heat generated due to the laser absorbing material layer 121 and the laser protection layer 141 absorbing the laser, thus preventing the heat from being transferred to the display panel used in conjunction with the laser touch panel 100, and avoiding an influence on the work performance and the life of the display panel by the heat generated by the absorbing material layer 121 and the laser protection layer 141. The heat insulating layer 142 can also prevent the heat generated by the display panel in operation from being transferred to the thermistor material layer 122, thereby preventing erroneous resistance change in the thermistor material layer 122 due to influence by the heat generated by the display panel and avoiding error touch.

Even though FIG. 1(a) and FIG. 1(b) illustrates that each of the laser absorbing material layer 121 and the thermistor material layer 122 are formed on the entire surface of the laser touch panel 100, the present embodiment is not limited thereto. For example, the laser absorbing material layer 121 or the thermistor material layer 122 can also be formed in a criss-cross lattice. For example, when the laser absorbing material layer 121 is formed in a lattice, the thermistor material layer 122 disposed below the laser absorbing material layer 121 is exposed in each grid, and the first conductive layer can be in direct contact with the thermistor material layer 122. This will not only improve the detection accuracy, reduce the crosstalk, but also broaden the material selection scope of the laser absorbing material layer 121, not only a small resistance material (such as conductive material) but also a great resistance material (such as insulating material) can be selected.

Figure 3A:
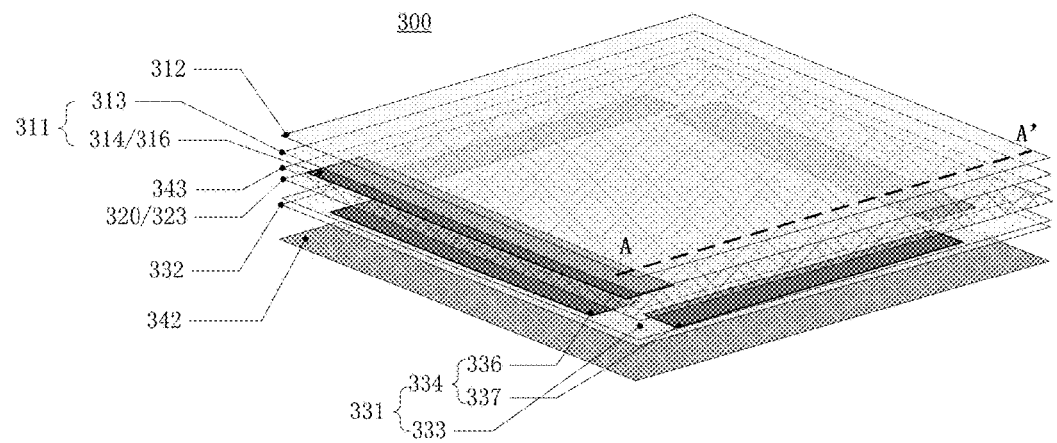
FIG. 3(*a*) is a schematic view of a laser touch panel according to another embodiment of the present disclosure.
Figure 3B:
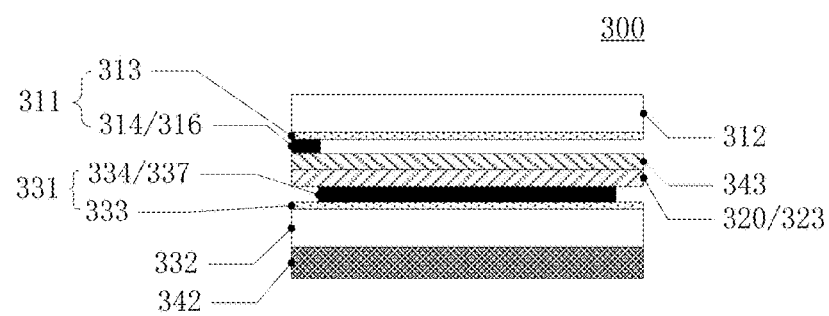

FIGS. 3(a) and 3(b) illustrate a schematic structural view and a schematic cross-sectional view of a laser touch panel 300 according to another embodiment of the present disclosure. FIG. 3(b) is a cross-sectional view taken along line A-A' of the laser touch panel 300 illustrated in FIG. 3(a).

For example, as illustrated in FIG. 3(a) and FIG. 3(b), the laser touch panel 300 comprises a first conductive layer 311, a second conductive layer 331, and a light-induced resistance change material layer 320 disposed between the first conductive layer 311 and the second conductive layer 331 and is electrically connected to the first conductive layer 311 and to the second conductive layer 331. The light-induced resistance change material layer 320 is configured to generate a resistance change at a touch position subjected to laser irradiation. The location where the resistance change occurs can be detected so that it can be used to achieve touch.

For example, as illustrated in FIG. 3(a) and FIG. 3(b), the light-induced resistance change material layer 320 comprises a photosensitive material layer 323, resistance of which decreases at a touch position subjected to laser irradiation with laser intensity increasing. The material for the photosensitive material layer 323 can be selected depending on the operating wavelength of the laser touch panel 300. For example, the material for the photosensitive material layer 323 can comprise one of lead sulfide, lead selenide, cadmium sulfide and cadmium selenate or their combination.

For example, it is preferable that, in order to improve the touch accuracy, the laser touch panel 300 can further comprise a filter material layer 343 provided on the side of the photosensitive material layer 323 facing the first conductive layer 311. The filter material layer 343 is configured to transmit only a specific laser band, thereby preventing the ambient light from acting on the photosensitive material layer 323, thereby preventing erroneous touch. Since the filter material layer 343 may filter the light emitted by the display panel that can be used in conjunction with the laser touch panel 300, the filter material can only be provided at the gap between pixel units of the display panel so as not to affect the transmittance of light emitted from the display panel. For example, the filter material layer 343 can employ a multi-layer dielectric film designed for a particular band.

For example, the laser touch panel 300 can further comprise a first transparent substrate 312 and a second transparent substrate 332 disposed parallel to each other and opposite to each other. The first transparent substrate 312 and the second transparent substrate 332 can be glass substrates, quartz substrates, plastic substrates (e.g., PET substrates), or substrates made of other suitable materials.

For example, the first conductive layer 311 is provided on the side of the first transparent substrate 312 facing the light-induced resistance change material layer 320, and the second conductive layer 331 is disposed on the side of the second transparent substrate 332 facing the light-induced resistance change material layer 320. The first conductive layer 311 comprises a first transparent conductive film 313 and a first electrode 314 provided on the first transparent conductive film 313 and electrically connected to the first transparent conductive film 313. The stacked position relationships of the first transparent conductive film 313 and the first electrode 314 can be exchanged with each other. The second conductive layer 331 comprises a second transparent conductive film 333 and a second electrode 334 disposed on the second transparent conductive film 333 and electrically connected to the second transparent conductive film 333. And the stacked location relationships between the second transparent conductive film 333 and the second electrode 334 can also be exchanged with each other. The first electrode 314 comprises an electrode 316 (electrode 316, for example, being a stripe-like electrode) provided along the edge of the side of the laser touch panel 300. The second electrode 334 comprises two parallel strip-like third sub-electrodes 336 and two parallel strip-like fourth sub-electrodes 337, and the third sub-electrode 336 and the fourth sub-electrodes 337 are crossing each other. For example, the first sub-electrode 315 and the second sub-electrode 335 are perpendicular to each other.

For example, the first transparent conductive film 313 can be made of a nickel alloy, indium tin oxide (ITO), indium zinc oxide (IZO), or other suitable transparent conductive material; and the second transparent conductive film 333 can be made of indium tin oxide (ITO), Indium zinc oxide (IZO), or other suitable materials. The material for forming the first electrode 314 and the second electrode 334 can be selected from silver, copper, aluminum, aluminum alloy or other suitable conductive material.

Figure 4A:
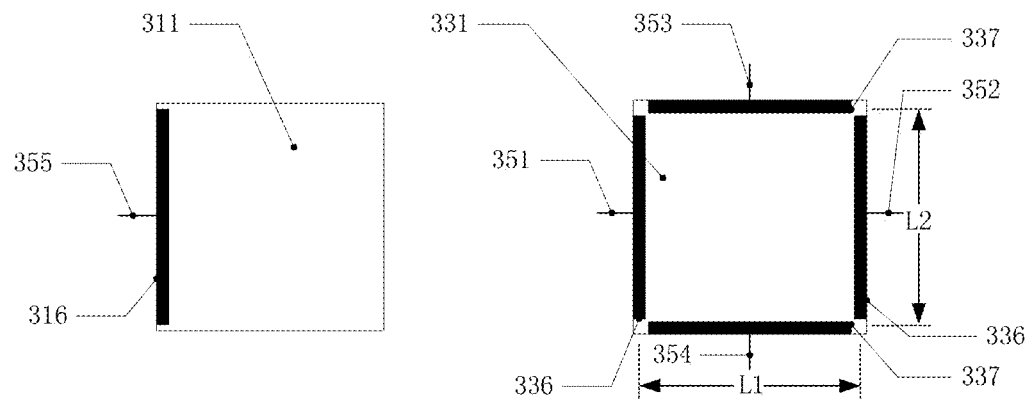
FIG. 4(*a*) is a schematic plan view of the first conductive layer and the second conductive layer of the laser touch panel according to another embodiment of the present disclosure.
Figure 4B:
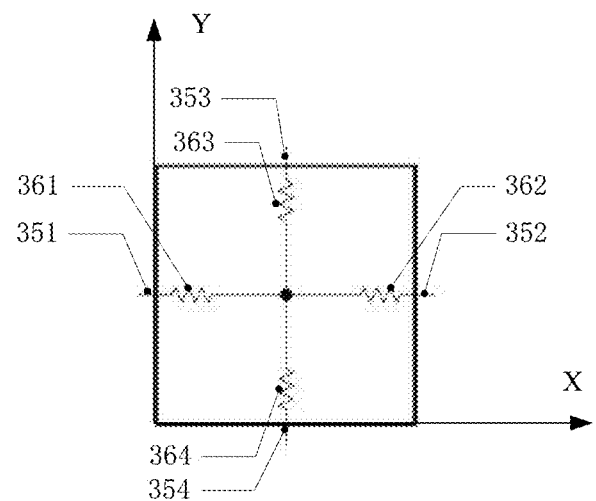

In the present embodiment, there may be various touch position determining methods based on the operation principle of the laser touch panel 300. Hereinafter, the operation principle of the laser touch panel 300 and the method of determining the touch position will be described in connection with the example as illustrated in FIG. 4(a) and FIG. 4(b).

For example, as illustrated in FIG. 4 (a), the distance between two parallel strip-like third sub-electrodes 336 is L1, the first lead 351 is electrically connected to one of the strip-like third sub-electrodes 336, and the second lead 352 is electrically connected to the other stripe third sub-electrode 336. The distance between two parallel strip-shaped fourth sub-electrodes 337 is L2, the third lead 353 is electrically connected to one of the strip-like fourth sub-electrodes 337, the fourth lead 354 is connected to the other stripe fourth sub-electrode 337. In addition, the fifth lead 355 is electrically connected to the electrode 316 (e.g., the stripe-like electrode) located on the first conductive layer 311.

For example, when touched by the laser (for example, by irradiated by laser), the resistance of the photosensitive material layer 323 at the touch position is lowered, and the first conductive layer 311 and the second conductive layer 331 are conducted at the touch position, and the voltage on the second conductive layer 331 corresponding to the touch position can be acquired from the fifth lead 355. In this case, the equivalent circuit formed by the first conductive layer 311, the second conductive layer 331, and the photosensitive material layer 323 is as illustrated in FIG. 4 (b). A first resistor 361 (resistance of which is R1) is formed between the touch position and the stripe-like third sub-electrode 336 electrically connected to the first lead 351, a second resistor 362 (resistance of which is R2) is formed between the touch position and the stripe-like third sub-electrode 336 electrically connected to the second lead 352, a third resistor 363 (resistance of which is R3) is formed between the touch position and the stripe-like fourth sub-electrode 337 electrically connected to the third lead 353, and a fourth resistor 364 (resistance of which is R4) is formed between the touch position and the stripe-like fourth sub-electrode 337 electrically connected to the fourth lead 354.

For example, in order to clearly illustrate the touch position, a Cartesian coordinate system is introduced. The X-axis is parallel to the stripe-like fourth sub-electrode 337, and the Y-axis is parallel to the stripe-like third sub-electrode 336. And the symmetrical axis of the fourth sub-electrode 337 electrically connected to the fourth lead 354 in the direction of Y-axis coincides with the X-axis, and the symmetrical axis of the strip-like third sub-electrode 336 electrically connected to the first lead 351 in the direction of X-axis coincides with the Y-axis.

For example, in order to acquire the X coordinate of the touch position, the first driving voltage Vdrive1 is applied to the second lead 352 and the first lead 351 is grounded, so that a continuous uniform parallel voltage distribution is formed the two stripe-like third sub-electrodes 336 of the second conductive layer 331. Since the first conductive layer 311 and the second conductive layer 331 are conducted at the touch position, the first response voltage V1=R1/(R1+R2)×Vdrive1 can be acquired from the fifth lead 355 of the first conductive layer 311. Since the second transparent conductive film 333 (for example, an ITO layer) is uniformly conductive, the X-axis coordinate (first coordinate) of the touch position is Loc1=V1/Vdrive1×L1.

For example, in order to acquire the Y coordinate of the touch position, the second driving voltage Vdrive2 is applied to the third lead 353 and the fourth lead 354 is grounded, so that a continuous uniform parallel voltage distribution of formed between the two stripe-like fourth sub-electrodes 337 of the second conductive layer 331. Since the first conductive layer 311 and the second conductive layer 331 are conducted at the touch position, the second response voltage V2=R4/(R3+R4)×Vdrive2 can be acquired from the fifth lead 355 of the first conductive layer 311. Since the second transparent conductive film 333 (for example, an ITO layer) is uniformly conductive, the Y coordinate of the touch position (second coordinate) is Loc2=V2/Vdrive2×L2.

For example, embodiments of the present disclosure comprise, but are not limited to, acquiring the coordinates of the touch position in the manner described above. For example, the first driving voltage can be applied to the first lead 351 and the second lead 352 can be grounded, and the first response voltage is acquired through the fifth lead 355. And the second driving voltage can be applied to the fourth lead 354, and the third lead 353 can be grounded, and the second response voltage can be acquired through the fifth lead 355.

For example, the formula for calculating the coordinates of the touch position can be changed according to the change in the manner of applying the drive voltage and acquiring the response voltage and/or the change in the Cartesian coordinate system setting.

For example, when two strip-like third sub-electrodes 336 are provided along two edges of the touch panel in the width direction (X direction in FIG. 4 (b)), and the width of the two strip-like third sub-electrodes 336 is negligible with respect to the width of the touch panel, and the pitch L1 of the two stripe-like third sub-electrodes 115 can adopt the width value of the touch panel. When the two stripe fourth sub-electrodes 337 are respectively provided along the two edges of the touch panel in the length direction (Y direction in FIG. 4(b)), and the width of the two strip-like fourth sub-electrodes 337 is negligible with respect to the length of the touch, the pitch L2 of the two stripe-like fourth sub-electrodes 337 can adopt the length value of the touch panel. When the strip-like third sub-electrodes 336 and the strip-like fourth sub-electrodes 337 are not provided in the manner as described above, the pitch thereof can be obtained by test. Therefore, the coordinates of touch position that are irradiated with the laser can be obtained by the above-described method. And then touch operation can be achieved.

For example, by adopting the above-described arrangement, the first conductive layer 311 serves only as a conductor, thus a nickel-gold transparent conductive layer having good ductility and low resistivity can be used, so that the life of the first conductive layer 111 can be greatly improved.

For example, preferably, in order to protect the display panel provided on the back side of the laser touch panel 300, as illustrated in FIGS. 3(a) and 3(b), the laser touch panel 300 can further comprise a heat insulating layer 342, which can be provided on the side of the laser protection layer 341 away from the second transparent substrate 332. The material for forming the heat insulating layer 342 can be a heat insulating glass having a high transmittance for the light emitted from the display panel. For example, the insulating layer 342 can be made of phosphate glass or silicate glass. The heat insulating layer 342 can block the heat generated due to the photosensitive material layer 323 absorbing the laser, thus preventing the heat from being transferred to the display panel, and avoiding an influence on the work performance and the life of the display panel.

In the present embodiment, the light-induced resistance change material layer 320 is not limited to the abovementioned photosensitive resist material layer 323, but can be formed by structure in which the thermistor material layers and the laser absorbent material layer are laminated with each other, as described in connection with FIGS. 1(a) and 1(b); and accordingly, in the embodiment as described in connection with FIGS. 1(a) and 1(b), the light-induced resistance change material layer 320 can also be a photosensitive material layer.

Figure 5A:
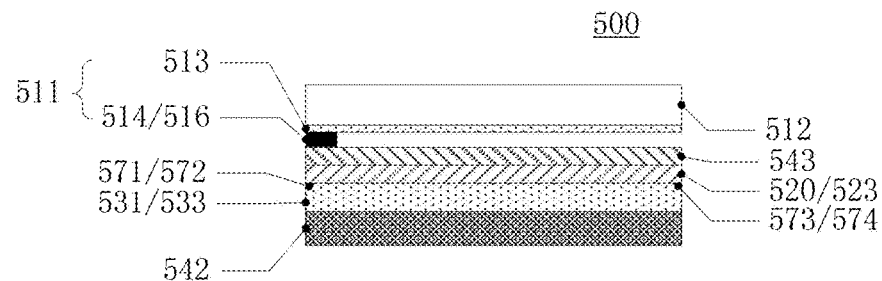
FIG. 5(*a*) is a schematic cross-sectional view of another structure of a laser touch panel according to another embodiment of the present disclosure.
Figure 5B:
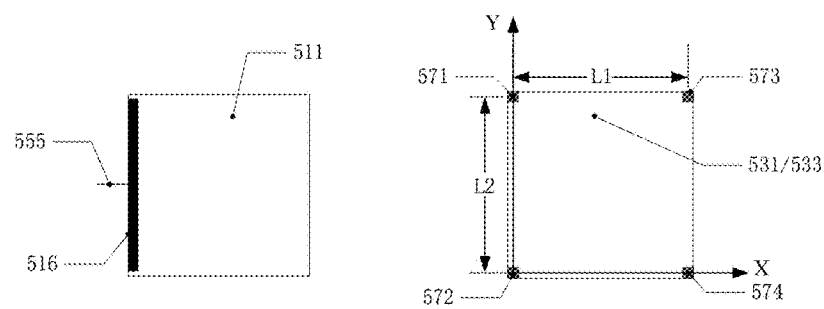

For example, FIG. 5(a) illustrates a schematic cross-sectional view of a structure of a laser touch panel 500 according to another embodiment of the present disclosure. As compared with the structure of the laser touch panel 300 illustrated in FIG. 3(b), the second transparent substrate 332 and the second electrode 334 are not provided in the touch panel and the second transparent conductive film 533 is a conductive glass. FIG. 5(b) illustrates a schematic plan view of the first conductive layer and the second conductive layer of another structure of the laser touch panel 100 according to another embodiment of the present disclosure. As illustrated in FIG. 5(b), the first contact point 571, the second contact point 572, the third contact point 573, and the fourth contact point 574 are provided at the upper left corner, the lower left corner, the upper right corner and the lower right corner of the transparent conductive film, respectively. The distance between the first contact point 571 and the third contact point 573 is L1, the distance between the first contact point 571 and the second contact point 572 is L2.

For example, in order to acquire the X coordinate of the touch position, the first driving voltage Vdrive1 can be applied to the third contact point 573 and the fourth contact point 574, and the first contact point 571 and the second contact point 572 can be grounded. At this time, a parallel electric field can be formed in the X direction, and the first response voltage V1 can be acquired through the fifth lead 555. Therefore, the X coordinate of the touch position (the first coordinate) Loc1=V1/Vdrive1×L1. In order to acquire the Y coordinate of the touch position, the second drive voltage Vdrive1 can be applied to the first contact point 571 and the third contact point 573, and the second contact point 572 and the fourth contact point 574 can be grounded. At this time, a parallel electric field can be formed in the Y direction, and the second response voltage V2 can be acquired through the fifth lead 555. Therefore, the Y coordinate of the touch position (the second coordinate) Loc2=V2/Vdrive2×L2.

For example, the second transparent conductive film is provided as a conductive glass, and the life of the second transparent conductive thin film layer can be improved. By setting the contact point at the four corners of the conductive glass to form a desired parallel electric field, the area of the touch region of the touch panel can be increased.

For example, the first transparent conductive film can also be provided as a conductive glass, and the electrode 516 can be provided on the conductive glass, in which case it is not necessary to provide the first transparent substrate.

Similarly, in the present embodiment, the light-induced resistance change material layer 520 is not limited to the photosensitive material layer 523 as described above, and can adopt the structure in which the thermistor material layers and the laser absorbing material layer are laminated with each other, as described in connection with FIGS. 1(a) and 1(b).

Figure 6:
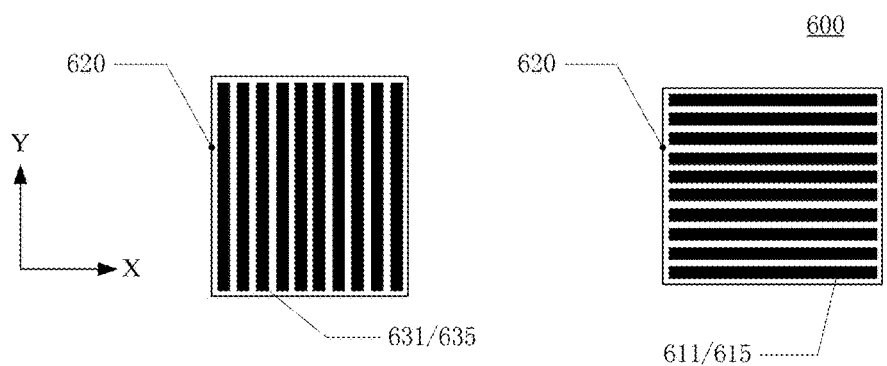
FIG. 6 is a schematic plan view of a first conductive layer and a second conductive layer of another structure of a laser touch panel according to still another embodiment of the present disclosure.

In another embodiment of the present disclosure, as illustrated in FIG. 6, the laser touch panel 600 comprises a first conductive layer 611, a second conductive layer 631, and a light-induced resistance change material layer 620. The light-induced resistance change material layer 620 is provided between the first conductive layer 611 and the second conductive layer 631, and is electrically connected to the first conductive layer 611 and to the second conductive layer 631. The first conductive layer 611 comprises, for example, a plurality of stripe-like electrodes 615 extending parallel to each other in a first direction (e.g., a lateral direction, i.e., an X direction), and the second conductive layer 631 comprises, for example, a plurality of stripe-like electrodes 635 extending parallel to each other in a second direction (for example, a longitudinal direction, i.e., a Y-direction). For example, the first conductive layer 611 and the second conductive layer 631 can be made of a transparent conductive material. The respective stripe-like electrodes of the first conductive layer and the second conductive layer are connected to a touch processing circuit (for example, a touch processing chip), for example, through leads.

When the laser is irradiated on the laser touch panel, for example, on a position where a stripe-like electrode of the first conductive layer and a stripe-like electrode of the second conductive layer intersect each other, the resistance of the light-induced resistance change material layer corresponding to the position decreases, so that the resistance between the stripe-like electrodes intersecting each other is reduced or the stripe-like electrodes are conducted. Thus, the output signals are received from the stripe-like electrodes of the second conductive layer, for example, by sequentially scanning the strip electrodes of the first conductive layer by applying a driving signal, and by analyzing the strip electrodes on the second conductive layer at each scanning, it is possible to acquire the coordinates of the touch position irradiated by the laser in the first direction and the second direction, and to determine the touch position on the touch panel.

In this embodiment, similarly, the light-induced resistance change material layer can comprise a layer of a thermistor material and a laser absorbing material layer which are laminated with each other, or the light-induced resistance change material layer comprises a photosensitive material layer.

Figure 7:
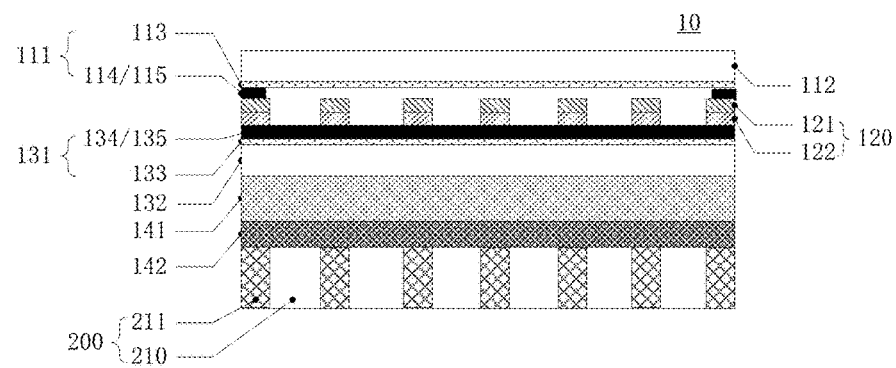
FIG. 7 is a schematic structural view of a laser touch display device according to still another embodiment of the present disclosure.
Figure 8:
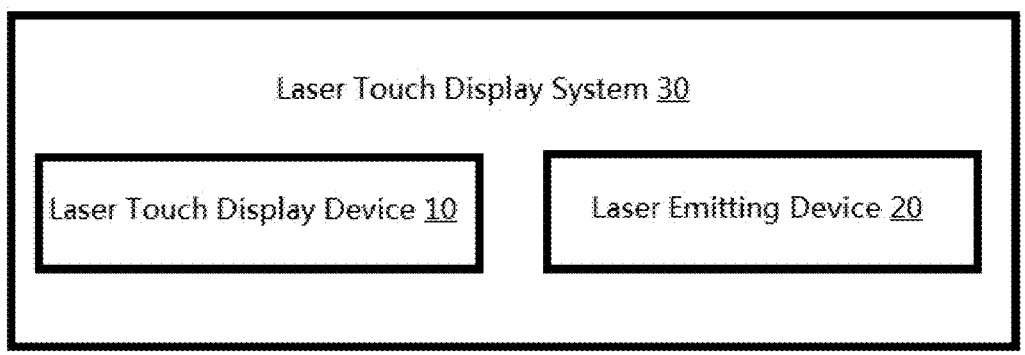
FIG. 8 is a laser touch display system according to still another embodiment of the present disclosure.

For example, FIG. 7 illustrates a laser touch display device 10 according to a further embodiment of the present disclosure. As illustrated in FIG. 7, the laser touch display device 10 comprises a laser touch panel 100 as described above and a display panel 200. The display panel 200 is disposed on the side of the second conductive layer 131 away from the light-induced resistance change material layer 120. The display panel 200 can be provided as a liquid crystal display panel or an OLED display panel, etc., depending on the practical application requirements, and is not limited thereto.

For example, the display device 10 is not limited to the case where the laser touch panel 100 is comprised, and can comprise a laser touch panel 300, a laser touch panel 500, a laser touch panel 600, or a laser touch panel according to other embodiment obtained by combining different features in particular embodiments.

For example, the display panel 200 comprises a plurality of pixel units 210 that are, for example, arranged as a pixel array. The plurality of pixel units 210 can have a gap 211 in the lateral and longitudinal directions, the light-induced resistance change material layer 120 disposed on the position of the laser touch panel 100 corresponding to the gap 211. For example, the light-induced resistance change material layer 120 can be formed into a lattice. The above-described configuration achieves the remote laser touch of the laser touch display device 10 and avoids the light-induced resistance change material layer 120 blocking the light emitted from the display panel and improves the transmittance of the laser touch panel to light emitted from the display panel.

For example, the laser touch display device 10 further comprises a touch processing circuit (not shown in the figures) that is connected to the first conductive layer 111 and the second conductive layer 131 and is configured to apply a first driving voltage to the first conductive layer 111 so as to test a first response voltage V1 of the second conductive layer 131, and apply a second driving voltage Vdrive2 to the second conductive layer 131, so as to test a second response voltage V2 of the first conductive layer 111, or, configured to apply a first driving voltage to the second conductive layer 131 so as to test a first response voltage V1 of the first conductive layer 111 and apply a second driving voltage to the second conductive 131 so as to test a second response voltage V2 of the first conductive layer 111; acquiring a first coordinate Loc1 of a touch position irradiated with a laser based on a first ratio of the first response voltage V1 to the first driving voltage Vdrive1; and acquiring the second coordinate Loc2 of the tough position irradiated with the laser based on the second ratio of the second response voltage V2 to the second driving voltage Vdrive2. The specific calculation formula of the first coordinate Loc1 and the second coordinate Loc2 can be found in the embodiment of the laser touch display panel, and will not be elaborated here.

For example, the touch processing circuit can apply a first driving voltage and/or a second driving voltage and read the first response voltage and/or the second response voltage through some of the first leads, the second leads, the third leads, the fourth leads, and the fifth leads described in the embodiments of the present invention.

For example, a further embodiment of the present disclosure provides a laser touch display system 30 comprising a laser emitting device 20 and the laser touch display device 10 described above. The laser emitting device 20 is configured to output a laser for touch, and the wavelength of the laser output from the laser emitting device 20 can be selected according to the operating wavelength of the laser touch display device 10. For example, the wavelength of laser can be selected according to a wavelength to which the light-induced resistance change material layer in the laser touch display device 10 can respond, which can be visible or invisible light (e.g., infrared light). Also, for example, in the case of invisible light, the laser emitting device 20 can further comprise a touch position indicating device that emits a visible light beam onto the touch panel to indicate a touch position. The laser touch display system 30 can achieve a remote laser touch on the laser touch display device 10.

Figure 9:
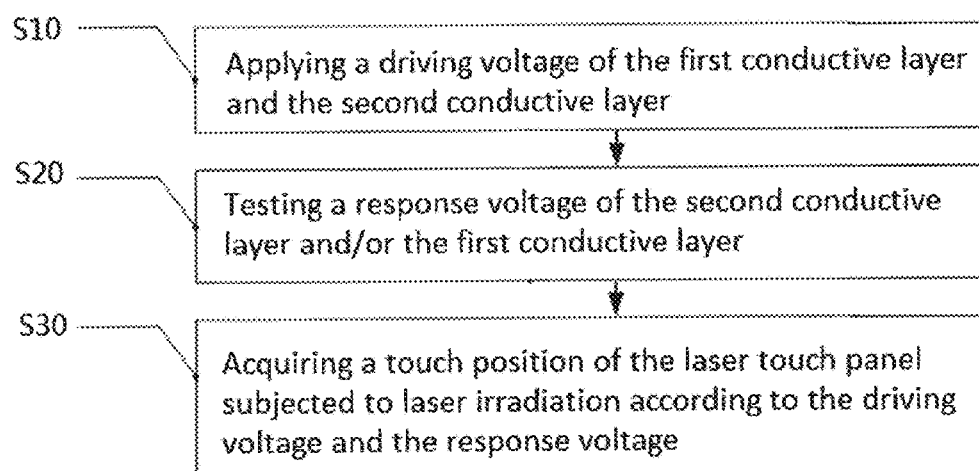
FIG. 9 is a flowchart of a laser touch method for a laser touch panel according to still another embodiment of the present disclosure.

For example, FIG. 9 is a flow chart of a laser touch method for the laser touch panel according to still another embodiment of the present disclosure. As illustrated in FIG. 9, the touch method can include the following steps:

Step S10: applying a driving voltage to the first conductive layer and/or the second conductive layer.

Step S20: testing a response voltage of the second conductive layer and/or the first conductive layer.

For example, applying a driving voltage to the first conductive layer and/or the second conductive layer and measuring a response voltage of the first conductive layer and/or the second conductive layer comprises: applying a first driving voltage Vdrive1 to the first conductive layer and measuring a first response voltage V1 of the second conductive layer, and applying a second driving voltage Vdrive2 to the second conductive layer and measuring a second response voltage V2 of the first conductive layer; or, applying a first driving voltage Vdrive1 to the second conductive layer and measuring a first response voltage V1 of the first conductive layer, and applying a second driving voltage Vdrive2 to the second conductive layer and measuring a second response voltage V2 of the first conductive layer.

Step S30: acquiring the touch position of the laser touch panel subjected to laser irradiation according to the driving voltage and the response voltage.

For example, acquiring the touch position irradiated by laser according to the driving voltage and the response voltage comprises: acquiring a first coordinate Loc1 of the touch position subjected to laser irradiation according to a first ratio of the first response voltage V1 to the first driving voltage Vdrive1; acquiring the second coordinate Loc of the touch position subjected to laser irradiation according to and the second ratio of the second response voltage V2 to the second driving voltage Vdrive2.

For example, the formula for calculating the first and second coordinates of the touch position and the meaning of L1 and L2 can be found in the method described in FIGS. 2(a) and 2(b) and FIGS. 4(a) and 4(b), and will not be elaborated here.

For example, the first ratio is V1/Vdrive1 and the second ratio is V2/Vdrive2. The first coordinate of the touch position is Loc1=V1/Vdrive1×L1, and the second coordinate of the touch position is Loc2=V2/Vdrive2×L2.

Embodiments of the present disclosure provides a laser touch panel and a laser touch method thereof, a laser touch display device and a laser touch display system, realizing a remote laser touch on a display device.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201610815077.3 filed on Sep. 9, 2016, the disclosure of which is hereby entirely incorporated by reference.

The invention claimed is:

1. A laser touch panel, comprising:
 a first conductive layer;
 a second conductive layer; and
 a light-induced resistance change material layer;
 wherein the light-induced resistance change material layer is disposed between the first conductive layer and the second conductive layer and is electrically connected to the first conductive layer and the second conductive layer, wherein the light-induced resistance change material layer comprises a thermistor material layer and a laser absorbing material layer which are laminated with each other, the laser absorbing material layer is configured to generate heat at the touch position when irradiated with a laser so that the touch position undergoes a temperature change, and the thermistor material layer is configured to generate resistance change depending on the temperature change.

2. The laser touch panel according to claim 1, wherein a material for the thermistor material layer comprises a thermosensitive ceramic with a negative temperature coefficient.

3. The laser touch panel according to claim 1, wherein a material for the laser comprises carbon steel.

4. The laser touch panel according to claim 1, wherein the light-induced resistance change material layer comprises a photosensitive material layer.

5. The laser touch panel according to claim 4, wherein a material for the photosensitive material layer comprises one of lead sulfide, lead selenide, cadmium sulfide and cadmium selenate or their combination.

6. The laser touch panel according to claim 1, further comprising first transparent substrate and a second transparent substrate, wherein the first conductive layer is disposed on a side of the first transparent substrate facing the light-induced resistance change material layer, and the second conductive layer is disposed on the side of the second transparent substrate facing the light-induced resistance change material layer.

7. The laser touch panel according to claim 6, further comprising a laser protection layer disposed on a side of the second transparent substrate away from the light-induced resistance change material layer.

8. The laser touch panel according to claim 7, wherein material for the laser protection layer comprises glass doped rare earth element.

9. The laser touch panel according to claim 7, further comprising a heat insulating layer provided on a side of the laser protection layer away from the second transparent substrate.

10. The laser touch panel according to claim 9, wherein a material for the heat insulating layer comprises heat insulating glass.

11. The laser touch panel according to claim 1, wherein the first conductive layer comprises a first transparent conductive film and a first electrode disposed on the first transparent conductive film and electrically connected to the first transparent conductive film, the second conductive layer comprises a second transparent conductive film and a second electrode disposed on the second transparent conductive film and electrically connected to the second transparent conductive film.

12. The laser touch panel according to claim 11, wherein the first electrode comprises two strip-like first sub-electrodes arranged in parallel, the second electrode comprises two strip-like second sub-electrodes arranged in parallel, and the first sub-electrodes and the second sub-electrodes are arranged crossing each other.

13. The laser touch panel according to claim 11, wherein the second electrode comprises two strip-like third sub-electrodes arranged in parallel and two strip-like fourth sub-electrodes arranged in parallel, and the third sub-electrodes and the fourth sub-electrodes are perpendicular to each other.

14. A laser touch display device, comprising the laser touch panel according to claim 1.

15. The laser touch display device according to claim 14, further comprising a display panel disposed on a side of the second conductive layer away from the light-induced resistance change material layer.

16. The laser touch display device according to claim 15, wherein the display panel comprises a plurality of pixel units with a gap provided therebetween, and the light-induced resistance change material layer is disposed on a position of the laser touch panel corresponding to the gap.

17. The laser touch display device according to claim 1, further comprising a touch processing circuit, wherein the touch processing circuit is connected to the first conductive layer and the second conductive layer, and is configured to:
apply a first driving voltage to the first conductive layer so as to test a first response voltage of the second conductive layer, and apply a second driving voltage to the second conductive layer so as to test a second response voltage of the first conductive layer; or apply a first driving voltage to second conductive layer so as to test a first response voltage of the first conductive layer, and apply a second driving voltage to the second conductive layer so as to test a second response voltage of the first conductive layer;
acquire a first coordinate of a touch position irradiated by layer based on a first ratio of the first response voltage to the first driving voltage; and
acquire a second coordinate of a second coordinate of a touch position irradiated by layer based on a second ratio of the second response voltage to the second driving voltage.

18. A laser touch method for a laser touch panel according to claim 1, comprising:
applying a driving voltage to the first conductive layer and/or the second conductive layer;
testing a response voltage of the second conductive layer and/or the first conductive layer; and
acquiring a touch position of the laser touch panel irradiated by laser based on the driving voltage and the response voltage.

19. The laser touch method according to claim 18, wherein
applying a driving voltage to the first conductive layer and/or the second conductive layer and testing a response voltage of the first conductive layer and/or the second conductive layer comprises:
applying a first driving voltage to the first conductive layer so as to test a first response voltage of the second conductive layer, and applying a second driving voltage to the second conductive layer so as to test a second response voltage of the first conductive layer; or applying a first driving voltage to the second conductive layer so as to test a response voltage of the first conductive layer, and applying a second driving voltage to the second conductive layer so as to test a second response voltage of the first conductive layer; and
acquiring a touch position of the laser touch panel irradiated by laser based on the driving voltage and the response voltage comprises:
acquiring a first coordinate of the touch position irradiated by layer based on a first ratio of the first response voltage to the first driving voltage; and
acquiring a second coordinate of the touch position irradiated by layer based on a second ratio of the second response voltage to the second driving voltage.

* * * * *